(12) United States Patent  
Yokoyama et al.

(10) Patent No.: US 7,416,476 B2
(45) Date of Patent: Aug. 26, 2008

(54) BRAKE PAD GRINDING METHOD

(75) Inventors: Kozo Yokoyama, Gunma (JP); Ryoichi Sakaguchi, Gunma (JP)

(73) Assignee: Nisshinbo Industries, Inc, Tokyo (JP)

( * ) Notice: Subject to any disclaimer, the term of this patent is extended or adjusted under 35 U.S.C. 154(b) by 0 days.

(21) Appl. No.: 10/452,267

(22) Filed: Jun. 2, 2003

(65) Prior Publication Data

US 2004/0038630 A1    Feb. 26, 2004

(30) Foreign Application Priority Data

Jun. 6, 2002    (JP)    ............... 2002-165352

(51) Int. Cl.
*B24B 1/00*    (2006.01)
(52) U.S. Cl. ............... 451/58; 451/57; 451/63
(58) Field of Classification Search ............ 451/28, 451/57, 58, 63, 65, 120, 178
See application file for complete search history.

(56) References Cited

U.S. PATENT DOCUMENTS 5,613,898 A    3/1997    Lumen
6,110,009 A    8/2000    Hashimoto et al.

*Primary Examiner*—Timothy V Eley
(74) *Attorney, Agent, or Firm*—Muramatsu & Associates

(57) ABSTRACT

A method and apparatus for grinding a brake pad forms inclined faces at both ends of the brake pad through a single route of movement and no grinding limit quantity is involved whether boundary lines are parallel with each other or not. The apparatus includes: a fixing portion 11 for fixing a brake pad 3; a rotary whetstone 21 having a rotation axis parallel to a friction face 3a of the brake pad 3, a grinding face of which a distance to the rotation axis increases gradually or in a plurality of steps in one direction of the rotation axis, and another grinding face of which a distance to the rotation axis decreases gradually or in a plurality of steps in the one direction of the rotation axis; and a transporter 10 for moving one of the brake pad and the rotary whetstone in relation to each other in a intersecting direction to the rotation axis.

3 Claims, 9 Drawing Sheets

BRAKE PAD GRINDING METHOD

FIELD OF THE INVENTION

The present invention relates to a brake pad set of a disk brake, and more particularly, to an apparatus for and a method of grinding a brake pad of the brake pad set.

BACKGROUND OF THE INVENTION

A brake pad set used for a disk brake of an automobile generally comprises a steel backing plate and a brake pad (friction lining layer) adhered to the backing plate. Pressing and heating powder material in which a fiber, a filler, and a binder are mixed form the brake pad. The disk brake reduces the speed of an automobile by pressing the brake pad to a steel rotor disk.

When the disk brake is operated, the disk pad set and the rotor disk may vibrate to generate squealing. This squealing becomes an unpleasant noise, so that a variety of measures have been taken so far.

In order to prevent the squealing of the brake, an inclined face can be formed on each of the both ends of a brake pad as a known measure.

FIGS. 6A-6B show a conventional brake pad set with inclined faces, in which FIG. 6A is a front view, and FIG. 6B is a bottom view. The brake pad set 1 shown in FIGS. 6A-6B comprises a steel backing plate 2 and a brake pad 3 adhered thereto. The brake pad 3 comprises a central flat friction face 3a and inclined faces 3b, 3b at both ends. Boundary lines 5, 5 between the friction face 3a and the inclined faces 3b, 3b are parallel with each other. This construction allows the lengths of the friction faces 3a contacting a rotor disk on the outer side and inner side become equal.

As described above, the provision of the inclined faces 3b, 3b allows the area of the friction face 3a to be reduced, resulting in reduced squealing.

FIGS. 7A-7B show another conventional brake pad set with inclined faces. FIG. 7A shows a brake pad set in which inclined faces 3d, 3d are formed at both ends in such a manner that a friction face 3c becomes a part of a sector of which longer circumference is positioned on the outer side of a rotor disk, and FIG. 7B shows another brake pad set in which inclined faces 3f, 3f are formed such that a friction face 3e becomes a part of a sector of which longer circumference is positioned on the inner side of a rotor disk. Boundary lines 6, 6 shown in FIG. 7A and boundary lines 7, 7 in FIG. 7B are not parallel with each other. In other words, in the brake pad set 1 illustrated in FIG. 7A, the length of the friction face 3c contacting a rotor disk on the outer side thereof is longer than that of the friction face 3c contacting a rotor disk on the inner side thereof. On the other hand, in the brake pad set 1 illustrated in FIG. 7B, the length of the friction face 3e contacting a rotor disk on the outer side thereof is shorter than that of the friction face 3e contacting a rotor disk on the inner side thereof.

It is considered that squealing of a disk brake is caused by vibration of a brake pad and a rotor disk at the operation of the brake. When the boundary lines 5, 6 are not parallel with each other, the vibration of the rotor disk can be reduced more effectively, therefore, as illustrated in FIGS. 7A-7B, the friction faces 3c and 3e have been formed in a sector shape.

By the way, the brake pad set 1 comprises the steel backing plate 2 and a brake pad attached thereto. After adhered to the backing plate 2, the brake pad is ground to finish the friction face 3a, 3c, 3e to a flat face with a desired flatness and to form the inclined faces 3b, 3d, 3f.

The above grindings are performed with rotary whetstones 4, and a process of grinding the friction faces 3a, 3c, 3e and a process of grinding the inclined faces 3b, 3d, 3f are separately performed. For example, plurality of whetstones with different angles corresponding to the angles of the inclined faces to be ground are prepared for grinding the inclined faces 3b, 3d, 3f, and after the inclined face 3b, 3d, 3f are formed by using a predetermined tool, the friction faces 3a, 3c, 3f are ground to be flat. In addition, the grindings of both ends of the inclined faces 3b, 3d, 3f are not carried out simultaneously, but are ground from one side to the other, one by one.

As a result, with the above method, manpower is increased, and tools should be changed every time processes change from the grinding of the inclined faces to that of the friction faces, resulting in poor productivity. On the other hand, in Japanese Patent Application Laid-open No. Heisei 9-136255, a grinding method shown in FIGS. 8A-8D is proposed to grind the brake pad set shown in FIGS. 6A-6B.

At first, the brake pad set 1 is supported as shown in FIG. 8A. The rotary whetstone 4 is positioned such that a rotation shaft 4a becomes parallel to the friction face 3a. Under the condition, the rotary whetstone 4 is rotated in a direction shown by the arrow D, and grinding starts from the right end of the brake pad 3 through the rotary whetstone 4. The brake pad set 1 moves toward right in FIG. 8A, and this direction coincides with a circumference of a rotor disk not shown. As indicated by the arrow C, grinding starts from a condition that the brake pad set 1 is situated near the rotary whetstone 4, and the brake pad set 1 moves in such a manner as to become far from the rotary whetstone 4 as the brake pad set 1 moves rightward, which allows an end of the inclined face 3b to be formed as illustrated in FIG. 8B.

Then, as shown in FIG. 8B, the brake pad set 1 moves with the distance to the rotary whetstone 4 is maintained constant, which causes the flat face of the friction face 3a to be ground.

After the friction face 3a is ground, as illustrated in FIG. 8C, the brake pad set 1 is transported right while it is gradually brought close to the rotary whetstone 4 to gradually increase the amount that the friction face 3a is ground. Finally, as shown in FIG. 8D, an opposite inclined face 3b is formed. With this method, when the length of the rotary whetstone 4 along the rotation shaft 4a is designed sufficiently to cover the dimension of the brake pad set 1 only, grindings of the inclined faces 3b, 3b and the friction face 3a are carried out along a single route.

With the abovementioned method, however, following problems arise.

FIG. 9 shows an enlarged view of the brake pad set 1 and the rotary whetstone 4 illustrated in FIGS. 4A-4B. When the inclined face 3b is ground by the rotary whetstone 4, the rotary whetstone 4 moves from the position shown by the solid line along the inclined face 3b. Since the brake pad 3 is adhered to the backing plate 2, when the backing plate 2 considerably projects out of the brake pad 3, after reaching to the position shown by the phantom line, the rotary whetstone 4" can not move along the inclined face 3b any more. Therefore, the inclined face 3b is only formed up to a contact point P of the rotary whetstone 4' and inclined face 3b, so that a portion d remains as it is.

The remainder (grinding limit quantity) d is calculated by the following formula:

$$d = R(1-\cos\alpha)$$

where, R: radius of the rotary whetstone 4, α: angle of the inclined face 3b.

According to this formula, when R increases, d also increases; therefore, a desired inclined face 3*b* is liable not to be obtained.

Although shortening the radius R of the rotary whetstone 4 can solve the above problem, this measure causes the life of the rotary whetstone 4 to be shortened, and the frequency that the whetstone should be replaced will be increased, resulting in poor productivity. Further, the shorter the radius R of the whetstone becomes, the rotation of the whetstone should be faster to secure sufficient grinding velocity. Therefore, it is difficult to shorten the radius R of the rotary whetstone 4.

Further, in the above grinding method, it is impossible to form the inclined faces 3*d*, 3*f* of which boundary lines 6, 6 and 7, 7 are not parallel with each other as illustrated in FIGS. 7A-7B. It is another problem that one of the inclined faces 3*d*, 3*f*, the friction faces 3*c*, 3*e*, and the other inclined faces 3*d*, 3*f* should be ground in separate steps.

SUMMARY OF THE INVENTION

The present invention has been made to solve the above problems and it is an object of the present invention to provide a method of and an apparatus for grinding a brake pad in which inclined faces at both ends of the brake pad can be ground along a single route and no grinding limit quantity is generated whether the boundary lines are parallel with each other or not.

To accomplish the above objective, an apparatus for grinding a brake pad according to the present invention is characterized in that the apparatus comprises: a fixing portion for fixing a brake pad; a rotary whetstone having a rotation axis parallel to a friction face of the brake pad, a grinding face of which a distance to the rotation axis increases gradually or in plurality of steps in one direction of the rotation axis, and another grinding face of which a distance to the rotation axis decreases gradually or in plurality of steps in the one direction of the rotation axis; and a transporter for moving one of the brake pad and the rotary whetstone in relation to each other in an intersecting direction to the rotation axis.

The rotary whetstone of the apparatus for grinding a brake pad may be provided with a cylindrical portion between the grinding faces, and distance between a grinding face of the cylindrical portion and the rotation axis is constant. It is also possible to construct the fixing portion so as to change an angle that the brake pad is supported, and to construct the rotary whetstone so as to change a distance to the brake pad.

Further, a method of grinding a brake pad according to the present invention is characterized in that the method comprises the steps of; fixing a brake pad set comprising a backing plate and a brake pad attached thereto; and grinding the brake pad by a rotary whetstone with the rotary whetstone moving in relation to the brake pad set in an intersecting direction to the rotation axis, the rotary whetstone having a rotation axis parallel to a friction face of the brake pad, a grinding face of which a distance to the rotation axis increases gradually or in plurality of steps in one direction of the rotation axis, and another grinding face of which a distance to the rotation axis decreases gradually or in plurality of steps in the one direction of the rotation axis.

In the above method, the grinding can be performed from an end to another end of the brake pad by a relative movement between the brake pad set and the rotary whetstone, where a distance between the brake pad set and the rotary whetstone is gradually changed, or the rotary whetstone may be provided with a cylindrical portion between the grinding faces; a distance between a grinding face of the cylindrical portion and the rotation axis is constant; inclined faces are formed at both ends of the brake pad by the two grinding faces of which a distance to the rotation axis increases gradually or in plurality of steps; and a friction face is formed between the both inclined faces by the cylindrical portion.

BRIEF DESCRIPTION OF THE DRAWINGS

The present invention will be more apparent from the ensuring description with reference to the accompanying drawings wherein:

FIGS. 1A-1B show the first embodiment of the present invention, in which FIG. 1A is a plan view of a brake pad set, and FIG. 1B shows a condition that both inclined faces of a disk pad are being ground;

FIGS. 3A-3B show the second embodiment of the present invention, in which FIG. 3A is a plan view of a brake pad set, and FIG. 3B shows a condition that both inclined faces of a disk pad are being ground;

FIGS. 6A-6B show a conventional brake pad set, in which FIG. 6A is a front view, and FIG. 6B is a bottom view;

DETAILED DESCRIPTION OF THE INVENTION

Now, preferred embodiments of the present invention will be explained with reference to the drawings.

Figure 1A:
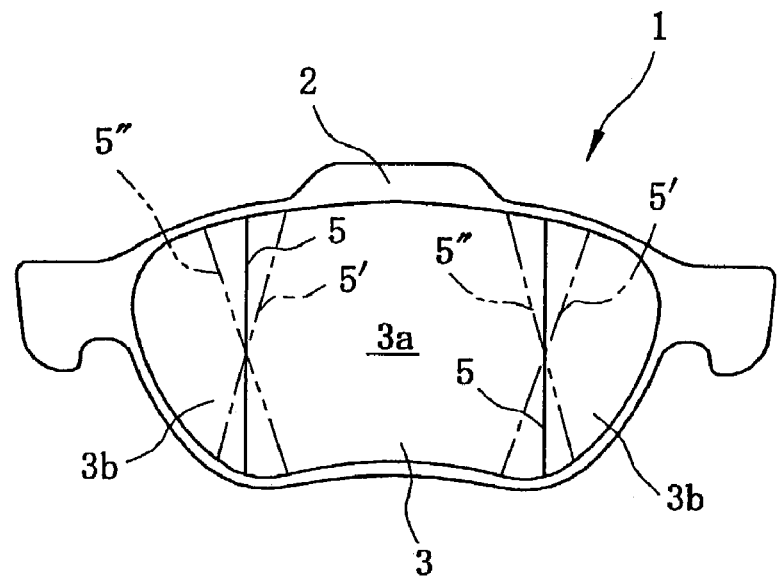
Figure 1B:
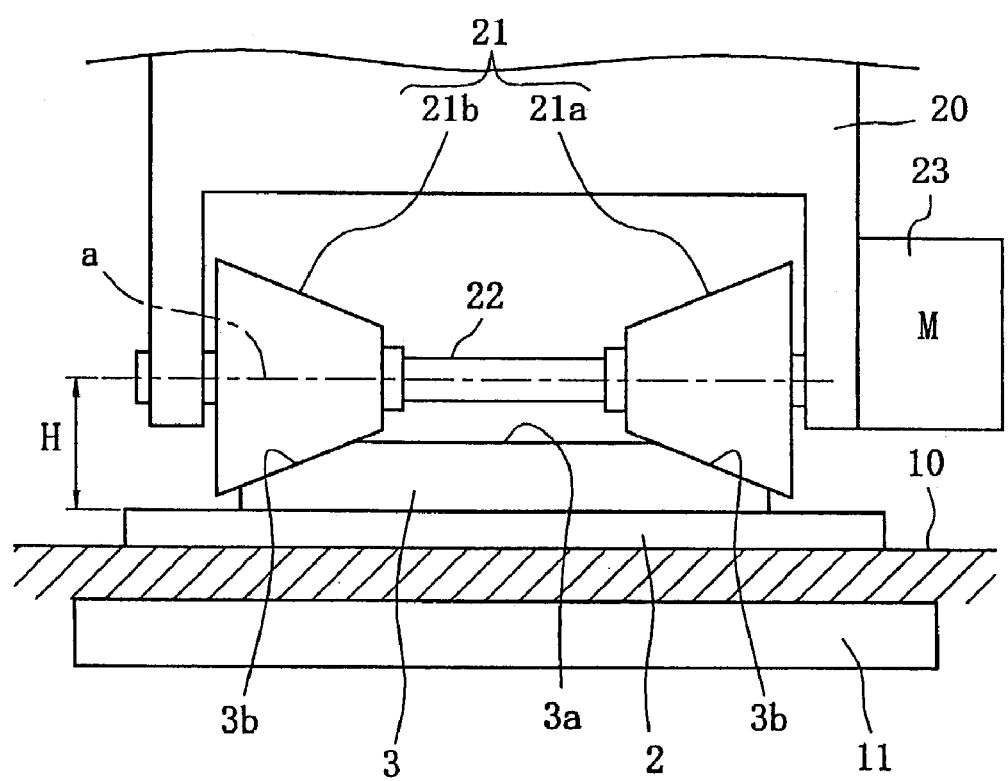
Figure 6A:
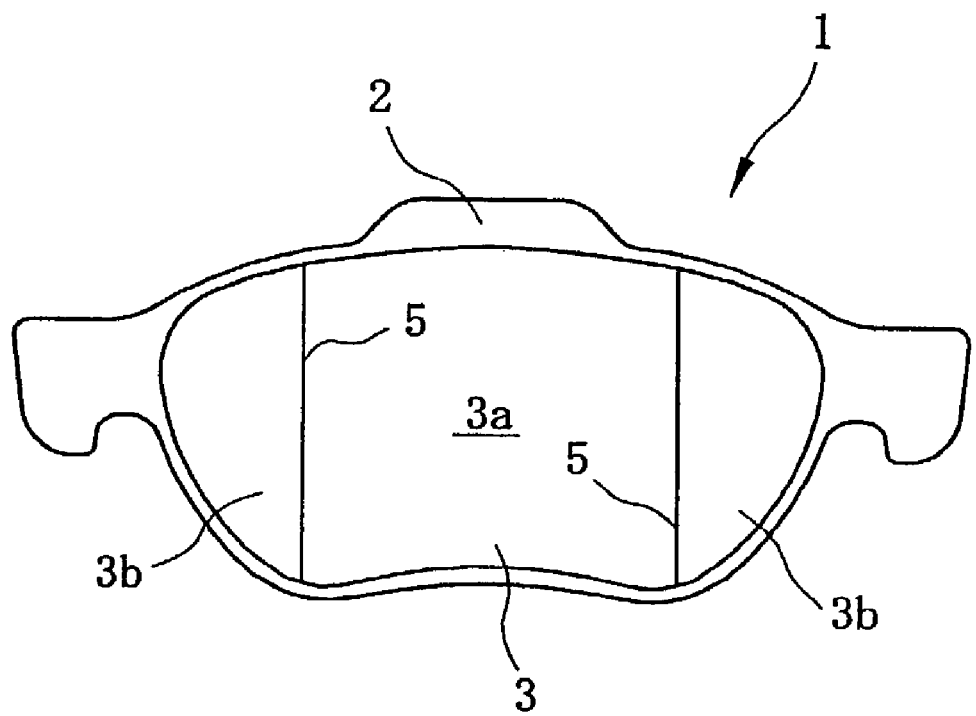
Figure 6B:
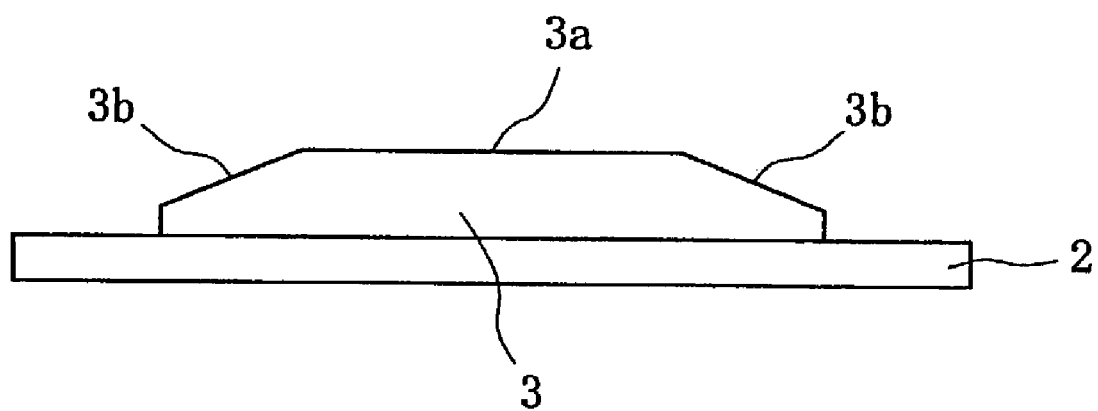

FIGS. 1A-1B show the first embodiment of the present invention, in which FIG. 1A is a plan view of a brake pad set, which is the same drawing as FIG. 6A. FIG. 1B shows a condition that both ends of a brake pad are being ground. In FIGS. 1A-1B, the brake pad set 1 is fixed on a transporter 10 through an electromagnet 11 as a fixing section. The transporter 10 is a conveyor in this embodiment. The electromagnet 11 circulates together with the conveyor, and when the electromagnet 11 reaches a grinding position, it is powered and works as a magnet to attract and fix a steel backing plate 2 of the brake pad set 1. When the electromagnet 11 has to leave the grinding position, the supply of the electric power to the electromagnet 11 stops, so that the brake pad set 1 is released and becomes detachable from the conveyor. It is a matter of course that the above construction is an embodiment and the brake pad set 1 can be fixed by a mechanical cramping means other than the electromagnet 11. In addition, the transporter 10 is not limited to the conveyor, but a bed of a grinding apparatus 20 and a feed screw can transport the brake pad set 1. On the contrary, it is possible to move the whetstone instead of the brake pad set 1.

The grinding apparatus 20 is provided with a rotary whetstone 21. Combining grinding particles such as diamond forms the rotary whetstone 21. The rotary whetstone 21 comprises two rotary whetstone portions 21*a*, 21*b*, of which diameter gradually increases toward outer portions thereof, and a shaft 22 connecting the two rotary whetstone portions 21*a*, 21*b*. That is, the distance between a rotation axis a to the grinding face of the whetstone portion 21*a* linearly increases toward the right-hand of the rotation axis a. On the other hand, the distance between a rotation axis a to the grinding face of the whetstone portion 21a linearly decreases toward the right-hand of the rotation axis a. Although the rotary whetstone 21 is divided to the two rotary whetstone portions 21a, 21b in the embodiment shown in FIGS. 1A-1B, the whetstone portions 21a, 21b can be connected with each other at opposing portions thereof to form a single hand-drum-shaped whetstone.

The shaft 22 of the rotary whetstone 21 rotates by a motor 23 mounted to the grinding apparatus 20. As illustrated in FIG. 1B, when the brake pad set 1 is ground while moving in an intersecting direction to the surface of the paper under the condition that the distance H between the brake pad set 1 and the shaft 22 is maintained constant, the inclined faces 3b, 3b at the both ends can be formed through one grinding motion.

Figure 9:
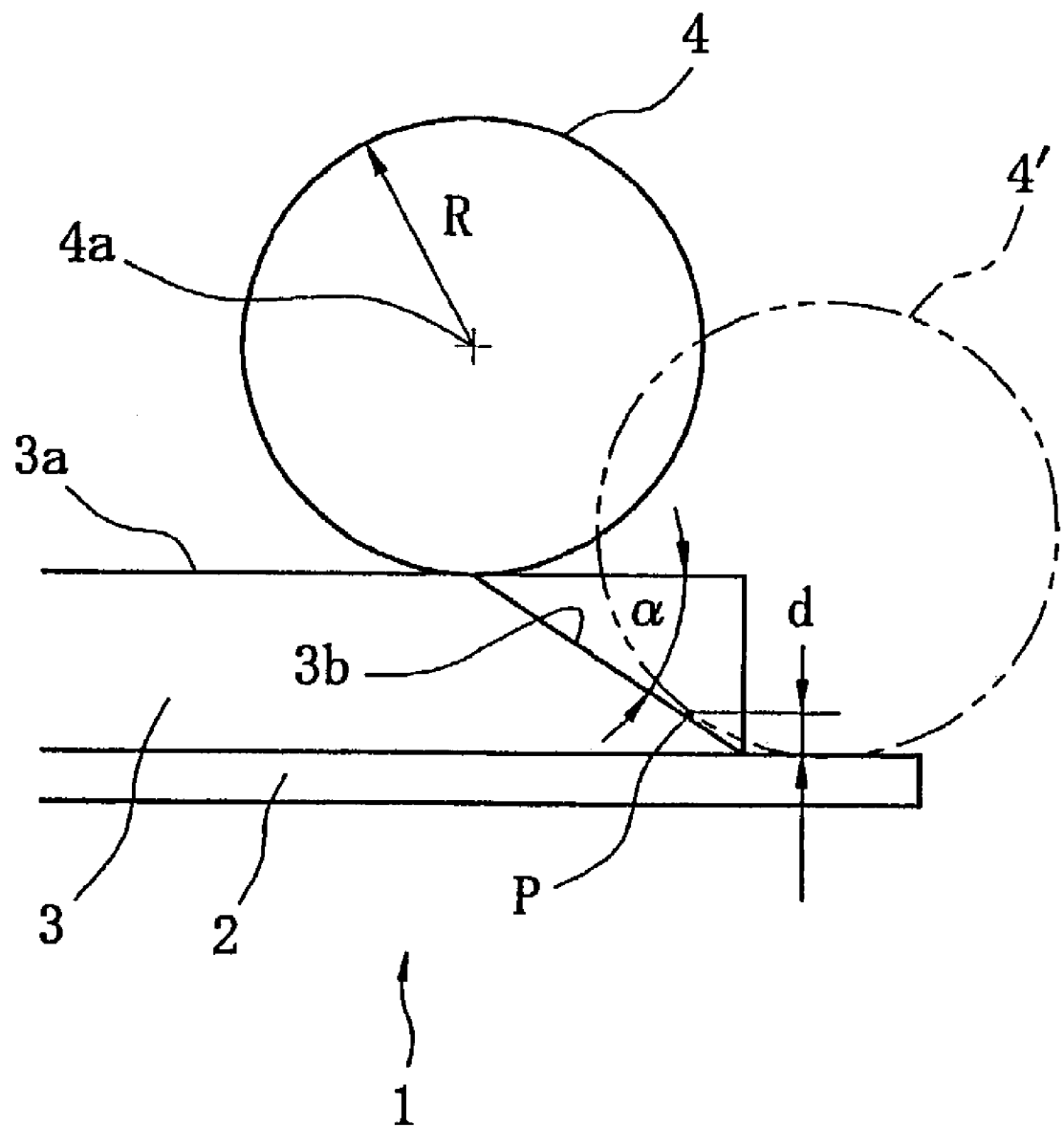
FIG. 9 is an enlarged view of the disk pad set and a portion of the rotary whetstone shown in FIGS. 8A-8D.

The inclined faces 3b, 3b, which are formed as described above, are provided with parallel boundary lines 5, 5 shown in FIG. 1A. In this case, the friction face 3a is ground in advance, or the face 3a is ground after the grindings of the inclined faces 3b, 3b. Further, in this embodiment, the rotation axis a of the rotary whetstone 21 is set parallel to the friction face 3a, and the rotation axis a is arranged in such a manner as to extend from one inclined face 3b to the other inclined face 3b of the brake pad set 1, so that the grinding limit quantity shown in FIGS. 9A-9B can be eliminated.

Fixing the brake pad set 1 while slightly rotating on the surface of the transporter 10 can incline the boundary lines 5, 5 as shown by the lines 5', 5" in FIG. 1A.

In order to incline the boundary lines 5, 5 like the lines 5", 5", it is also possible to transport the brake pad set 1 without being inclined and to move the rotary whetstone 21 toward the rotation axis a as transported by the brake pad set 1.

In the embodiment shown in FIGS. 1A-1B, the rotary whetstone 21 is formed to be a truncated cone, which allows the inclined face 3b to have flat surface. However, the inclined face 3b is not limited to have such a flat surface.

Figure 2A:
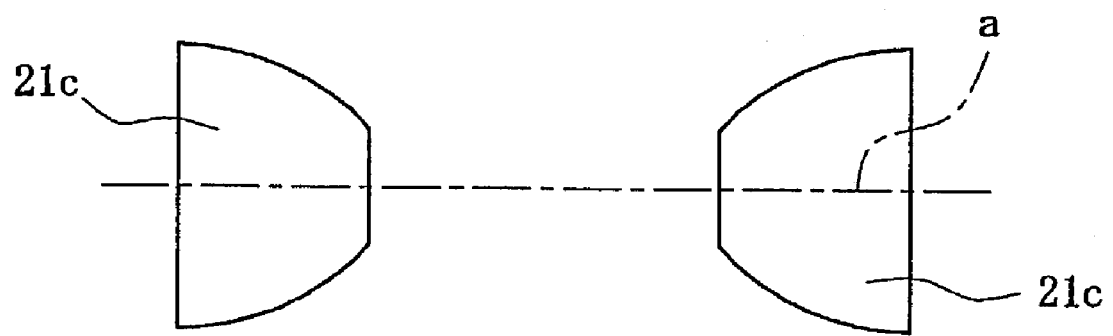
FIGS. 2A-2B show other rotary whetstones according to the present invention.
Figure 2B:
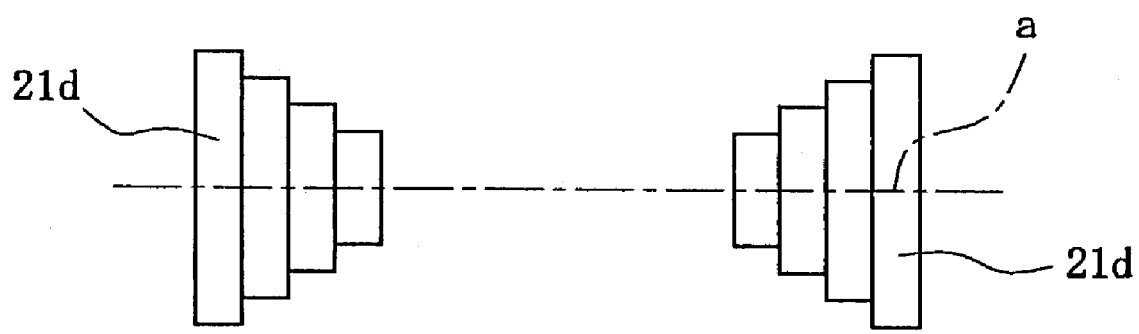

FIGS. 2A-2B show other rotary whetstones according to the present invention. Rotary whetstones 21c, 21c shown in FIG. 2A have cross-sections with outwardly bulged circumference of an oval. Other than the outwardly bulged circumference of an oval, an arc of a circle, a parabola, a hyperbola and so on may be adopted, and they may be inwardly bulged.

FIG. 2B shows an example of tiered rotary whetstones 21d, 21d. Generally, rotary whetstones according to the present invention may have grinding faces that the distances between portions on the grinding faces and the rotation axis a smoothly or stepwise increase or decrease along the rotation axis a toward one end thereof.

Figure 3A:
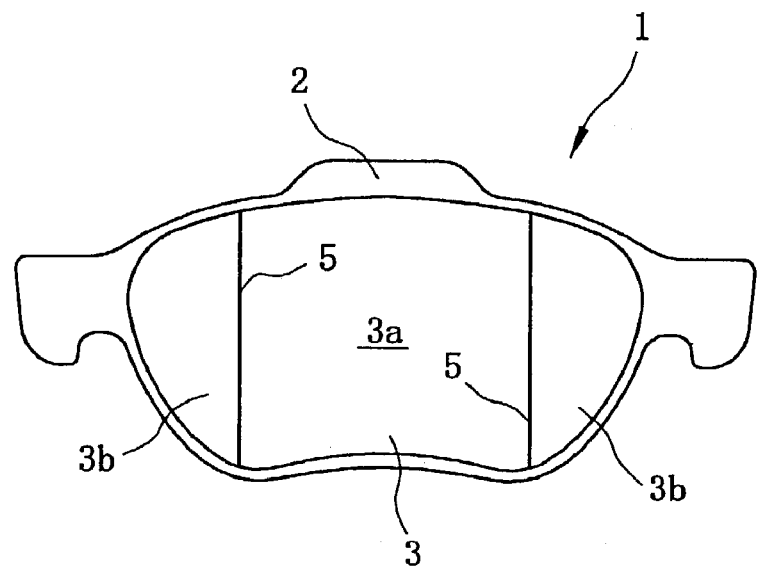
Figure 3B:
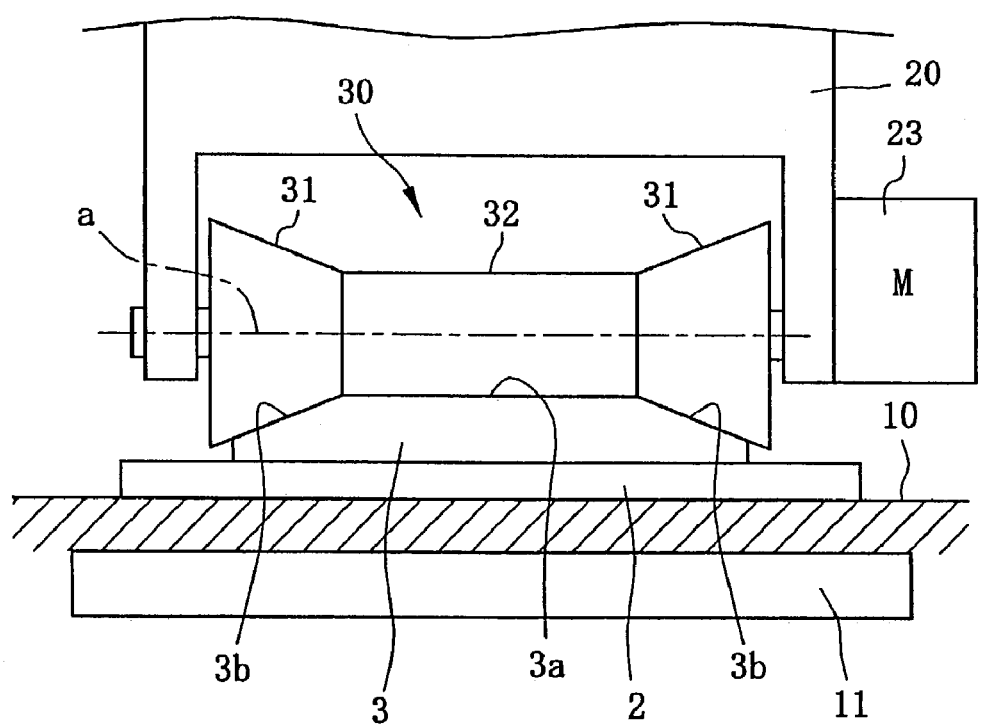

FIGS. 3A-3B show the second embodiment of the present invention. In FIGS. 3A-3B, the identical symbols are given to the same portions as shown FIGS. 1A-1B and the explanations thereof will be omitted. In this embodiment, all of the friction face 3a and the inclined faces 3b, 3b can be ground along a single route. The rotary whetstone 30 is provided with truncated cone portions 31, 31 at both ends thereof, and between the truncated cone portions 31, 31, a cylindrical portion 32 of which grinding face is equally apart from the rotation axis a. The truncated cone portions 31, 31 form the inclined faces 3b,3b at both ends, and the cylindrical portion 32 in the middle grinds the friction face 3a.

Figure 4A:
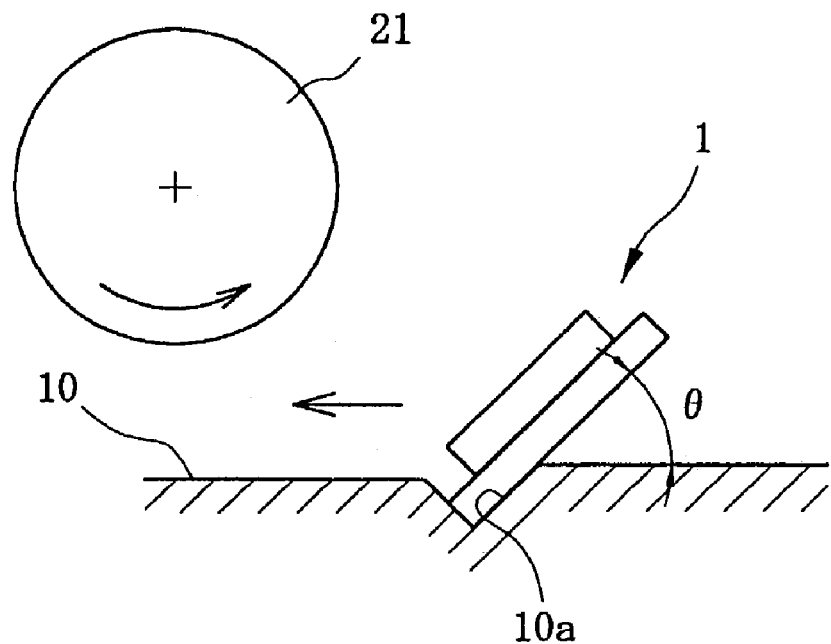
FIGS. 4A-4B are schematic views for explaining an apparatus and method according to the third embodiment of the present invention.
Figure 4B:
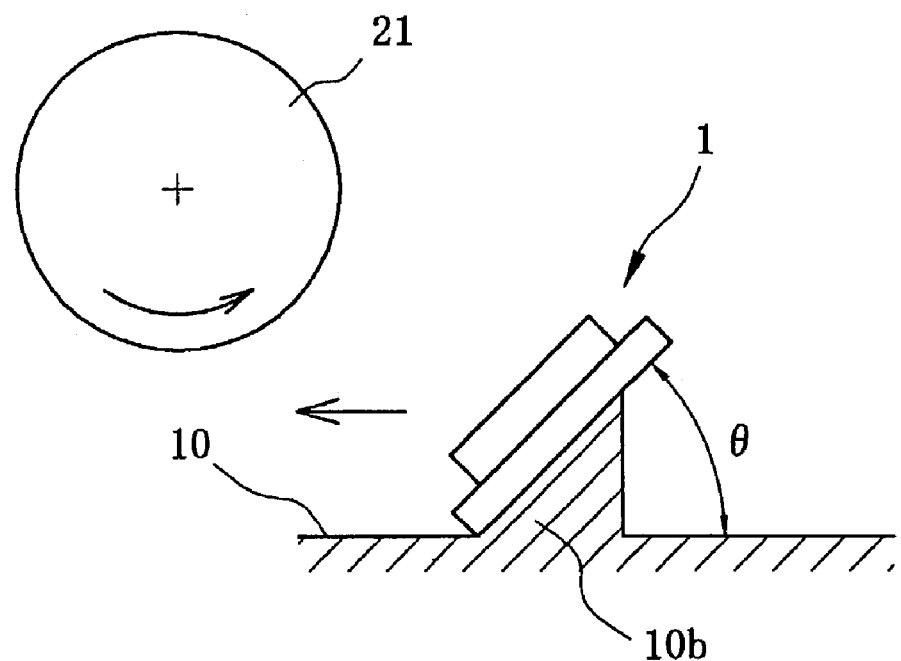
Figure 7A:
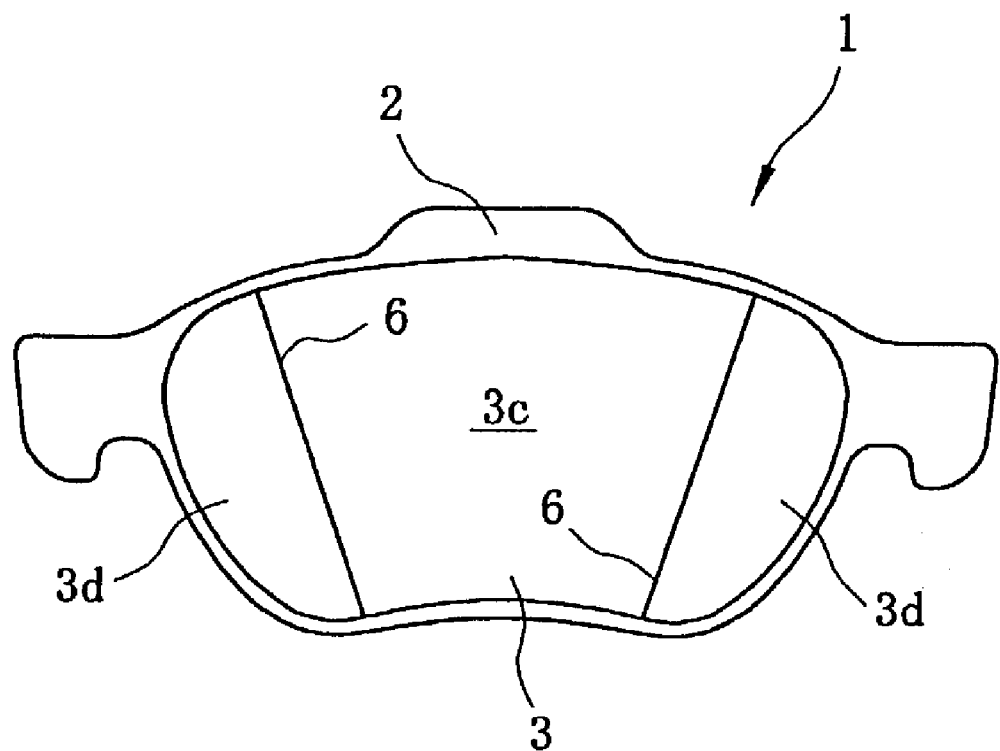
FIGS. 7A-7B show other conventional brake pad sets.
Figure 7B:
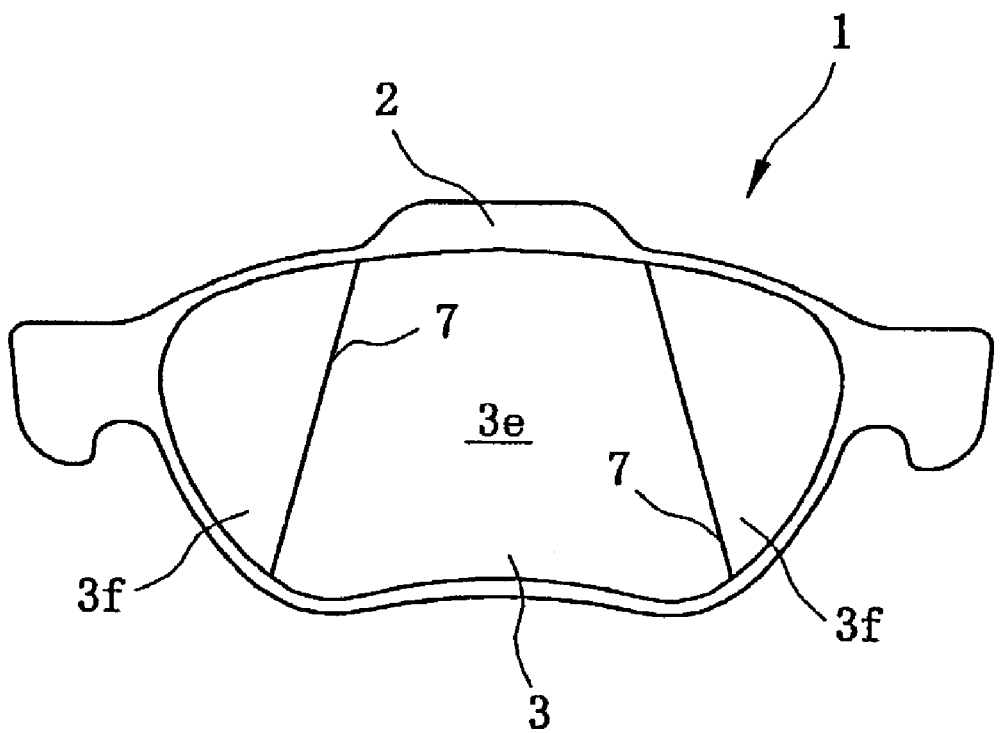
Figure 8A:
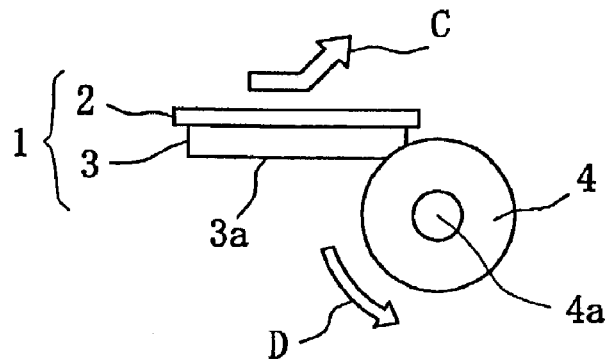
FIGS. 8A-8D show a method of grinding the brake pad set illustrated in FIGS. 6A-6B.
Figure 8B:
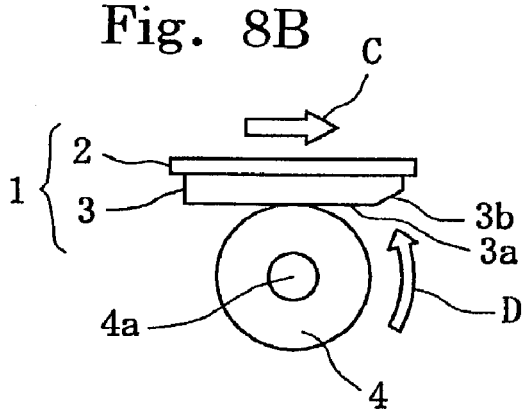
Figure 8C:
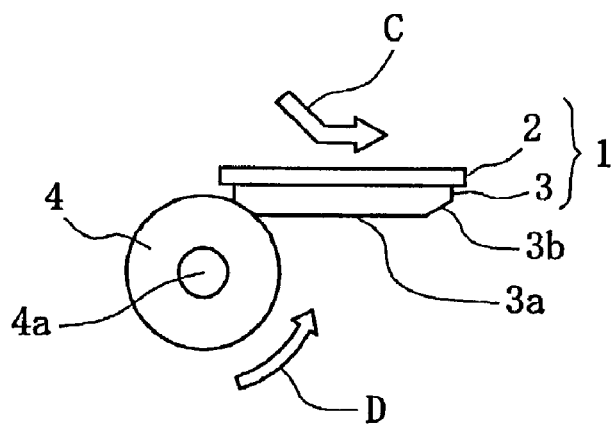
Figure 8D:
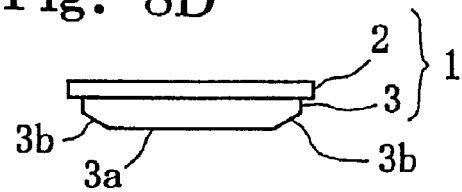

FIGS. 4A-4B are schematic views for explaining an apparatus and method according to the third embodiment of the present invention. In this embodiment, the inclined lines 3d, 3f, of which boundary lines 6, 6 in FIG. 7A or the boundary lines 7, 7 in FIG. 7B are not parallel with each other, and can be ground along a single route of movement of the transporter 10.

As illustrated in FIG. 4A, the transporter 10 is provided with a concaved fixing portion 10a to fix the brake pad set 1 in such a manner as to be inclined at an angle θ. The transporter 10 is formed on the conveyor. In the embodiment shown in FIG. 4B, a projecting fixing portion 10b is formed on the transporter 10 to fix the brake pad set 1 so as to be inclined at an angle θ. In the Figures, the angle θ is exaggerated, and the angle θ is actually between approximately 3 to 30 degrees and preferably between approximately 5 to 15 degrees. As described above, the brake pad set 1 is fixed so as to be inclined at the angle θ, and is ground with the same rotary whetstone 21 as shown in FIGS. 1A-1B. Then, the inclined faces 3d, 3d at both ends of the brake pad set 1 are ground along a single route. With reversely mounted brake pad set 1, the inclined faces 3f, 3f shown in FIG. 7B can be ground along a single route.

In the above embodiments, the fixing portions 10a, 10b always fix the brake pad set 1 so as to be inclined at the angle θ, the fixing portions 10a, 10b may be rotatable and are usually maintained flat (that is, θ=0) and when they reach at a grinding positions they may be inclined through solenoids or the like.

Figure 5A:
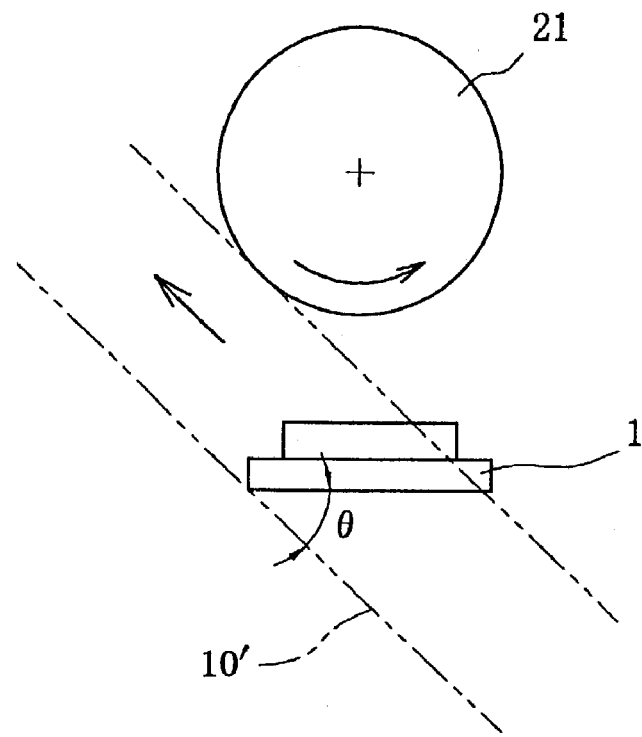
FIGS. 5A-5B are schematic views for explaining an apparatus and method according to the fourth embodiment of the present invention.
Figure 5B:
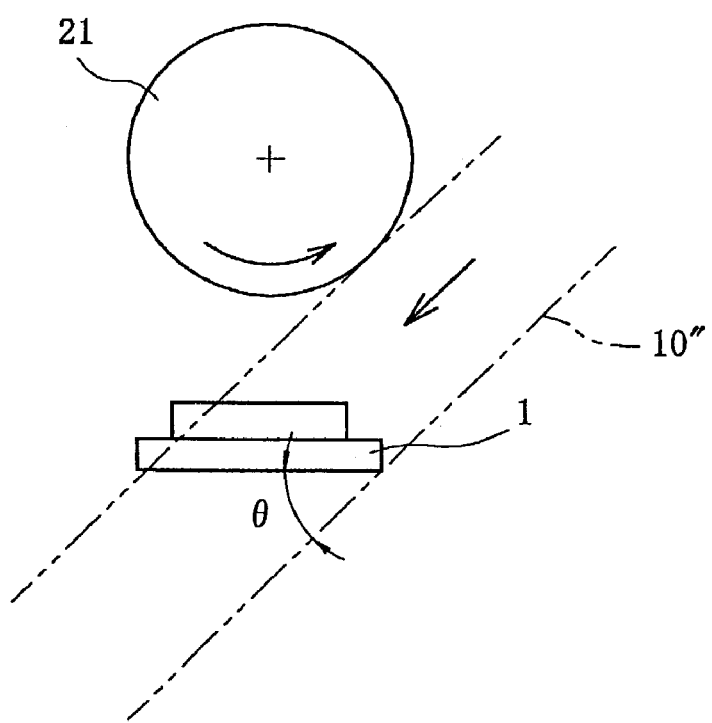

FIGS. 5A-5B are schematic views for explaining the third embodiment of the present invention. In FIGS. 5A-5B, the brake pad set 1 is maintained flat on the fixing portion and the route of a transporter is inclined. In FIG. 5A, the brake pad set 1 is ground while a transporter 10' lifts the brake pad set 1 from the lower-right to the upper-left of the rotary whetstone 21. In FIG. 5B, the brake pad set 1 is ground while a transporter 10" lowers the brake pad set 1 from the upper-right to the lower-left of the rotary whetstone 21. In any cases, the inclined faces 3d, 3d in FIG. 7A or the inclined faces 3f, 3f in FIG. 7B can be ground along a single route.

In the embodiments shown in FIGS. 4A-4B and 5A-5B, the brake pad set 1 moves linearly. It is possible to form the same inclined faces as the faces 3d, 3f by transporting the brake pad set 1 along a circumference of a circle. In this case, however, the boundary lines 5, 6 are not straight but are curved.

In the above embodiments, the rotary whetstone 21 is fixed and the brake pad set 1 on the transporter 10 is inclined. Making the rotary whetstone 21 movable on toward and apart from the brake pad performs the same grinding that the brake pad set 1 is inclined.

As described above, the apparatus for grinding a brake pad according to the present invention comprises: a fixing portion for fixing a brake pad; a rotary whetstone having a rotation axis parallel to a friction face of the brake pad, a grinding face of which a distance to the rotation axis increases gradually or in plurality of steps in one direction of the rotation axis, and another grinding face of which a distance to the rotation axis decreases gradually or in plurality of steps in the one direction of the rotation axis; and a transporter for moving one of the brake pad and the rotary whetstone in relation to each other in an intersecting direction to the rotation axis, which allows inclined faces at both ends of a brake pad to be ground along a single route.

When the rotary whetstone is provided with a cylindrical portion between the grinding faces, and distance between a grinding face of the cylindrical portion and the rotation axis is constant, a friction face and inclined faces at both ends of a brake pad can be ground along a single route.

When the fixing portion can change an angle that the brake pad is supported, or the rotary whetstone can change a distance to the brake pad, inclined faces at both ends of a brake pad of which boundary lines between a friction face and the inclined faces are not parallel with each other can be ground along a single route.

What is claimed is:

1. A method of grinding a brake pad comprising the steps of:
   transferring a brake pad set comprising a backing plate made of steel and a brake pad attached to the backing plate by a movement of a conveyor;
   fixing the brake pad set to a fixing section having an electromagnet when the brake pad set has reached a grinding position where the fixing section is formed on said conveyor and the brake pad set is fixed when the electromagnet is activated; and
   grinding said brake pad by a rotary whetstone with the rotary whetstone moving in relation to the brake pad set in an intersecting direction to a rotation axis of said rotary whetstone, said rotation axis of said rotary whetstone being parallel to a friction face of the brake pad, a distance from a grinding face of said rotary whetstone to said rotation axis increases gradually or in a plurality of steps in one direction of the rotation axis, and a distance from another grinding face of said rotary whetstone to said rotation axis decreases gradually or in a plurality of steps in said one direction of the rotation axis.

2. The method of grinding a brake pad as claimed in claim 1,
   wherein said grinding is performed from one end to another end of the brake pad by a relative movement between the brake pad set and the rotary whetstone, where a distance between a surface of the brake pad and the grinding face of the rotary whetstone is gradually changed with the movement of the conveyor.

3. The method of grinding a brake pad as claimed in claim 1,
   wherein said rotary whetstone is provided with a cylindrical portion between the grinding faces; a distance between a grinding face of the cylindrical portion and the rotation axis is constant; inclined faces are formed at both ends of said brake pad by the two grinding faces of the rotary whetstone where a distance from each of the two grinding faces to said rotation axis increases gradually or in a plurality of steps; and a friction face is formed between the both inclined faces by the cylindrical portion.

* * * * *